United States Patent
Dong et al.

(10) Patent No.: US 8,422,515 B2
(45) Date of Patent: Apr. 16, 2013

(54) METHOD, SYSTEM, AND DEVICE FOR TRANSMITTING DATA IN OPTICAL TRANSPORT NETWORK

(75) Inventors: Limin Dong, Shenzhen (CN); Chiwu Ding, Shenzhen (CN); Qiuyou Wu, Shenzhen (CN); Xin Xiao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 310 days.

(21) Appl. No.: 12/853,579

(22) Filed: Aug. 10, 2010

(65) Prior Publication Data
US 2010/0303464 A1 Dec. 2, 2010

Related U.S. Application Data

(63) Continuation of application No. PCT/CN2009/071722, filed on May 11, 2009.

(51) Int. Cl.
H04J 3/16 (2006.01)
H04J 3/22 (2006.01)

(52) U.S. Cl.
USPC .......................................................... 370/466

(58) Field of Classification Search .......................... None
See application file for complete search history.

(56) References Cited

U.S. PATENT DOCUMENTS

| 5,367,545 | A * | 11/1994 | Yamashita et al. | ............. 375/372 |
| 2006/0104309 | A1 * | 5/2006 | Vissers et al. | ................. 370/474 |
| 2007/0071443 | A1 * | 3/2007 | Fukumitsu et al. | ............. 398/79 |
| 2007/0116061 | A1 * | 5/2007 | Meagher et al. | ............. 370/503 |
| 2007/0248121 | A1 * | 10/2007 | Zou | .............................. 370/498 |
| 2008/0107418 | A1 * | 5/2008 | Zhang | .............................. 398/98 |
| 2008/0124079 | A1 | 5/2008 | Shimin et al. | |
| 2008/0279553 | A1 * | 11/2008 | Meagher et al. | ................. 398/58 |
| 2009/0086767 | A1 * | 4/2009 | Li | .............................. 370/542 |
| 2010/0067547 | A1 * | 3/2010 | Katagiri et al. | ............... 370/474 |
| 2010/0074624 | A1 * | 3/2010 | Miller et al. | .................... 398/98 |
| 2010/0189433 | A1 * | 7/2010 | Trojer | ............................. 398/8 |

FOREIGN PATENT DOCUMENTS

| CN | 1773898 | 5/2006 |
| CN | 1790993 | 6/2006 |
| CN | 1852215 | 10/2006 |
| EP | 1770886 | 4/2007 |

OTHER PUBLICATIONS

ITU-T Recommendation G.709/Y.1331, International Telecommunication Union, Mar. 2003 (pp. 1-109).
Form PCT/ISA/210, mailed Feb. 25, 2010, in corresponding International Application PCT/CN2009/071722 (3 pp.).
Form PCT/ISA/220, mailed Feb. 25, 2010, in corresponding International Application PCT/CN2009/071722 (3 pp.).
Form PCT/ISA/237, mailed Feb. 25, 2010, in corresponding International Application PCT/CN2009/071722 (3 pp.).

* cited by examiner

*Primary Examiner* — Hassan Phillips
*Assistant Examiner* — Prenell Jones
(74) *Attorney, Agent, or Firm* — Staas & Halsey LLP

(57) ABSTRACT

A method, a system, and a device for transmitting data in an OTN are disclosed herein. The method for transmitting data in an OTN includes: mapping the at least one pair of ODU0's to an ODTU to form an ODTUvkt, wherein k is greater than or equal to 1, t is 2 or 3, and an external structure of the ODTUvkt is the same as an external structure of an ODTUkt; and mapping the ODTUvkt to timeslot i and timeslot i+n of a 1.25 G ODUt, indicating the type of at least one pair of ODU0's carried in timeslot i to be ODUk, and transmitting the ODUk to a destination node.

7 Claims, 9 Drawing Sheets

| | Column | | | | | | |
|---|---|---|---|---|---|---|---|
| Row | 1 --- 7 | 8 --- 14 | 15 16 | 17 | --- | 3824 | 3825 --- 4080 |
| 1 | FAS | OTUk overhead | | | | | |
| 2 | | | OTUk overhead | OPUk payload area | | | FEC |
| 3 | OTUk overhead | | | | | | |
| 4 | | | | | | | |

FIG. 1

METHOD, SYSTEM, AND DEVICE FOR TRANSMITTING DATA IN OPTICAL TRANSPORT NETWORK

CROSS-REFERENCE TO RELATED APPLICATION

This application is a continuation of International Application No. PCT/CN2009/071722, filed on May 11, 2009, which is hereby incorporated by reference in its entirety.

FIELD OF THE INVENTION

The present invention relates to communication technologies, and in particular, to a method, a system, and a device for transmitting data in an Optical Transport Network (OTN).

BACKGROUND

The OTN technology is regarded as the core technology of the next-generation transport network. The OTN provides powerful Tandem Connection Monitoring (TCM) capabilities, rich Operation Administration Maintenance (OAM) capabilities, and outband Forward Error Correction (FEC) capabilities, and can schedule and manage large-capacity services flexibly.

The OTN technologies include electrical processing layer technologies and optical processing layer technologies. On the electrical processing layer, the OTN technology defines a "digital envelop" structure, which manages and monitors client signals effectively. FIG. 1 shows a structure of an OTN standard frame. An OTN frame is a 4080*4 modular structure, namely, an Optical Channel Data Unit-k (ODUk). An ODUk includes: a Frame Alignment Signal (FAS), which provides the frame alignment function; Optical Channel Transport Unit-k (OTUk) overhead, which provides the network management functions of an OTU level; ODUk overhead, which provides the maintenance and operation functions; and Optical Channel Payload Unit-k (OPUk) overhead, which provides the service adaptation function; OPUk payload area, also known as OTN frame payload area, which provides the service bearing function; and a FEC byte, which provides the functions of detecting and correcting errors. The coefficient k represents the supported bit rates and different OPUk, ODUk, and OTUk, for example, k=1 indicating a bit rate of 2.5 Gbps, k=2 indicating a bit rate of 10 Gbps, and k=3 indicating a bit rate of 40 Gbps.

The standard defines an OPUk timeslot structure that supports times division at a 2.5 G granularity. That is, a cyclical timeslot of an OPU2 (or ODU2) is divided into four timeslots, and a cyclical timeslot of an OPU3 (or ODU3) is divided into sixteen timeslots. In order to transmit low-rate services in the OTN, the standard formulates a new ODU of a 1.25 G level (namely, ODU0). The corresponding OPUk timeslot structure can support timeslot division at a 1.25 G granularity. That is, a cyclical timeslot of an OPU1 (or ODU1) is divided into two timeslots, a cyclical timeslot of an OPU2 (or ODU2) is divided into eight timeslots, a cyclical timeslot of an OPU3 (or ODU3) is divided into 32 timeslots, and a cyclical timeslot of an OPU4 (or ODU4) is divided into 80 timeslots.

In an OTN, in the communication between a network node of a 1.25 G timeslot structure and a network node of a 2.5 G timeslot structure, the network node of a 1.25 G timeslot structure uses a Generic Framing Procedure (GFP) mapping mode, encapsulates the packet service signals into an ODUk, maps the ODUk to the Optical Channel Data Tributary Unit-kt (ODTUkt), where t is greater than k, and finally maps the ODTUkt to timeslot i and timeslot i+n in a cyclical timeslot of an ODUt of a 1.25 G level (n is the number of cycles of a timeslot of an ODUt of a 2.5 G level, and the value of i falls between 1 and n) and transmits the ODTUkt to the destination node. In this way, the network node of the 2.5 G timeslot structure receives the ODUt sent by the network node of the 1.25 G timeslot structure, identifies only the indication of the ODUt included in timeslot 1 to timeslot n, and processes the ODUt.

In the process of developing the present invention, the inventor finds that: In the 2.5 G and 1.25 G timeslot structures defined in the standard, the timeslot structure of the OPU2 is different from that of the OPU3. Consequently, the transmission is restricted when the ODU0 newly defined in the 1.25 G timeslot structure is transmitted in the 2.5 G timeslot network after being carried through OPU2 or OPU3 in the 1.25 G timeslot structure, but the devices of the 2.5 G timeslot structure have been deployed in the network massively, which restricts the use range of the 1.25 G timeslot structure.

SUMMARY

The embodiments of the present invention provide a method, a system, and a device for transmitting data in an OTN. Therefore, the new 1.25 G timeslot structure can be transmitted in the 2.5 G timeslot network, and the 1.25 G timeslot structure is applicable in a wider range.

A method for transmitting data in an OTN in an embodiment of the present invention includes:

obtaining at least one pair of ODU0's;

mapping the at least one pair of ODU0's to an ODTU to form an ODTUvkt, where k is greater than or equal to 1, t is 2 or 3, and the external structure of the ODTUvkt is the same as the external structure of the ODTUkt; and mapping the ODTUvkt to timeslot i and timeslot i+n of a timeslot cycle of a 1.25 G ODUt, indicating the type of at least one pair of ODU0's carried in timeslot i to be ODUk, and transmitting the ODUk to a destination node, where n is the number of timeslots in a timeslot cycle in a 2.5 G ODUt.

A method for transmitting data in an OTN in an embodiment of the present invention includes:

receiving an ODUt sent by a network node of a 2.5 G timeslot structure, where the ODUt carries an ODTU;

checking whether the ODTU includes at least one pair of ODU0's; and obtaining the at least one pair of ODU0's from the ODTU, where t is 2 or 3.

A network node provided in an embodiment of the present invention includes:

a data obtaining unit, adapted to obtain at least one pair of ODU0's;

a mapping unit, adapted to: map the at least one pair of ODU0's obtained by the data obtaining unit to an ODTU to form an ODTUvkt, where k is greater than or equal to 1, t is 2 or 3, and the external structure of the ODTUvkt is the same as the external structure of the ODTUkt; and a mapping and transferring unit, adapted to: map the ODTUvkt formed by the mapping unit to timeslot i and timeslot i+n of a timeslot cycle of a 1.25 G ODUt, indicate the type of at least one pair of ODU0's carried in timeslot i to be ODUk, and transmit the ODUk to a destination node, where n is the number of timeslots in the timeslot cycle of a 2.5 G ODUt.

A network node provided in an embodiment of the present invention includes:

a data receiving unit, adapted to: receive an ODUt sent by a network node of a 2.5 G timeslot structure, where the ODUt carries an ODTU, and t is 2 or 3;

a determining unit, adapted to determine whether the ODTU carried in the ODUt received by the data receiving unit includes at least one pair of ODU0's; and an obtaining unit, adapted to obtain at least one pair of ODU0's if the determining unit determines that the ODTU includes at least one pair of ODU0's.

In the embodiments of the present invention, the network node maps at least one pair of ODU0's to an ODTU to form an ODTUvkt so that the external structure of the ODTUvkt is the same as the external structure of the ODTUkt, maps the ODTUvkt to timeslot i and timeslot i+n of a 1.25 G ODUt, indicates the type of the at least one pair of ODU0's carried in timeslot i to be ODUk, and transmits the ODUk to the destination node. After a device supporting only the 2.5 G timeslot network receives an ODU2 or ODU3 (ODU2/3), because the type of at least one pair of ODU0's carried in timeslot i is indicated as ODUk, the data in this timeslot is processed according to the ODUk processing method in the prior art. Through the data transmitting method under the present invention, when the ODU2/3 uses a 1.25 G timeslot structure to bear ODU0, the ODU0 can penetrate the device supporting only the 2.5 G timeslot structure. Therefore, the ODU0 can be transmitted in the device which supports only the 2.5 G timeslot structure, and the 1.25 G timeslot structure is applicable in a wider range.

BRIEF DESCRIPTION OF THE DRAWINGS

In order to make the technical solution under the present invention or the prior art clearer, the accompanying drawings for illustrating the embodiments of the present invention or the prior art are outlined below. Evidently, the accompanying drawings are for the exemplary purpose only, and those skilled in the art can derive other drawings from such accompanying drawings without making any creative effort.

FIG. 1 shows a structure of an OTN frame in the prior art;

DETAILED DESCRIPTION OF THE EMBODIMENTS

The technical solution under the present invention is expounded below with reference to accompanying drawings. Evidently, the embodiments given herein are for the exemplary purpose only, and are not all of the embodiments of the present invention. All other embodiments, which can be derived by those skilled in the art from the embodiments given herein without any creative efforts, fall within the scope of the present invention.

Method Embodiment 1

Figure 2:
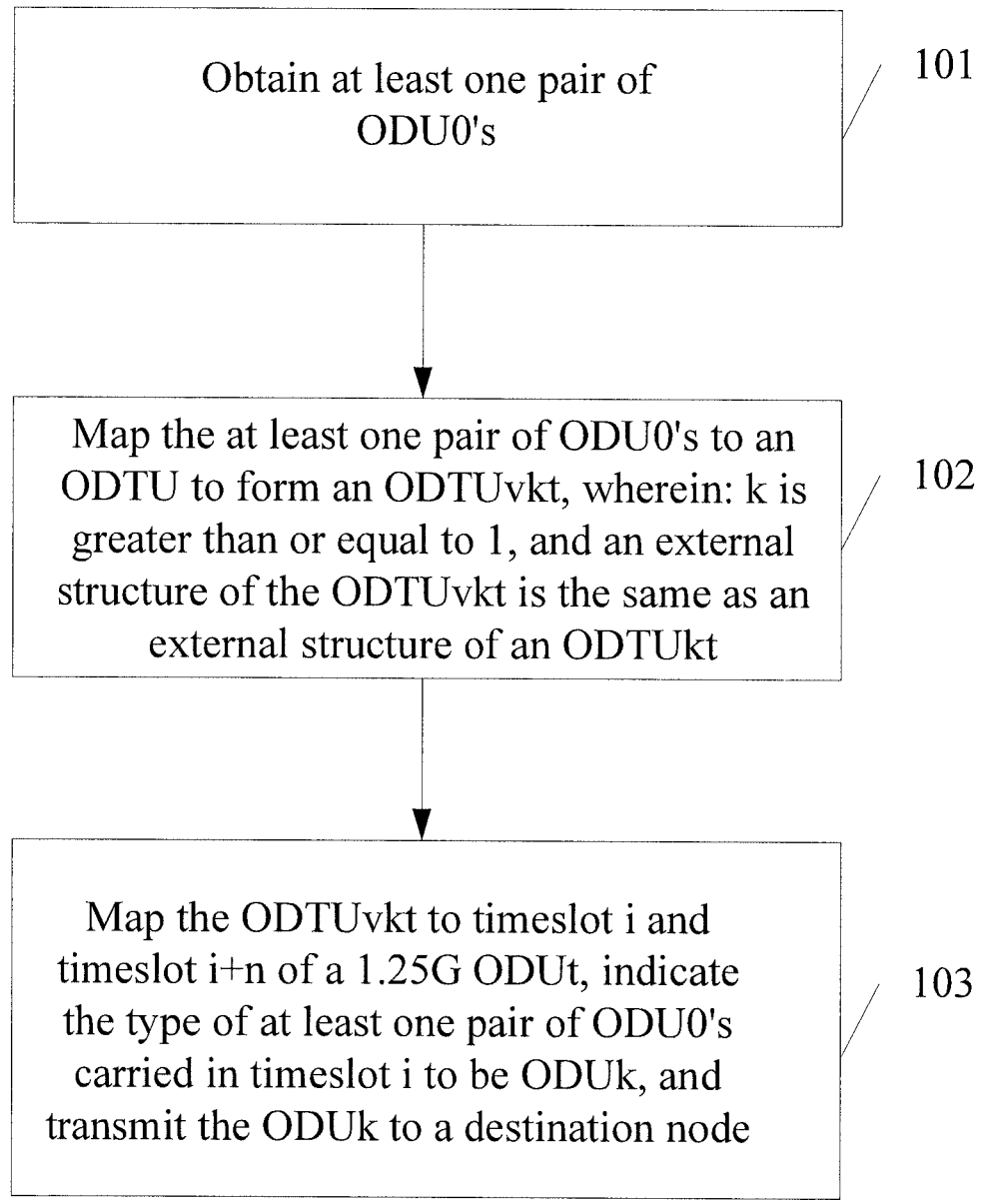
FIG. 2 is a flowchart of a method for transmitting data in an OTN in the first method embodiment.

A method for transmitting data in an OTN is provided in this embodiment. In this embodiment, the network node bears data through a 1.25 G timeslot structure, and transmits the data. The network node is a device that supports the 1.25 G timeslot network. As shown in FIG. 2, the method includes the following steps:

Step 101: The network node obtains at least one pair of ODU0's.

The network node obtains the ODU0 by: mapping the client signal to the ODU0 according to the method in G.709 Amd3 Clause 17.7.1, or receiving the ODU0 transmitted by other nodes through the line higher-order ODUk. The frequency deviation between the locally generated ODU0 and the received ODU0 falls between +20 ppm and −20 ppm.

Step 102: The network node maps the at least one pair of ODU0's to an ODTU to form an ODTUvkt, where k is greater than or equal to 1, t is 2 or 3, and the external structure of the ODTUvkt is the same as the external structure of the ODTUkt.

Before the ODUk is mapped to the ODUt, the ODUk needs to be mapped to the ODTUkt. Afterward, the ODTUkt is mapped to the ODUt, where k is less than t. The external structure of the ODTUvkt is the same as the external structure of the ODTUkt, but the internal structure is different, where v does not represent any essential meaning but makes the ODTU different from the ODTUkt. The same external structure here refers to the same number of rows and columns, the same position of the fixed filler column, and the same structure and indication rules of the overall Justification Control (JC) indication.

The external structure of a pair of ODU0's is approximately equal to the external structure of an ODU1. For example, a pair of ODU0's is mapped to an ODTU to form an ODTUv1t whose external structure is the same as the external structure of an ODTU1t.

Step 103: The network node maps the ODTUvkt to timeslot i and timeslot i+n of a timeslot cycle of a 1.25 G ODUt, indicates the type of at least one pair of ODU0's carried in timeslot i to be ODUk, and transmits the ODUk to a destination node, where n is the number of timeslots in a timeslot cycle of a 2.5 G ODUt.

Because the ODTUvkt and the ODTUkt have the same external structure, the method of mapping the ODTUvkt to timeslot i and timeslot i+n of the 1.25 G ODUt is the same as the method of multiplexing the ODTUkt to the timeslot of the 1.25 G ODUt in the prior art.

It is understandable that if the number of timeslots in a timeslot cycle of a 1.25 G ODUt is x, the value of i falls between 1 and x/2. For example, if t is equal to 2, the value of i falls between 1 and 4; if t is equal to 3, the value of i falls between 1 and 16.

In the embodiments of the present invention, the network node maps at least one pair of ODU0's to an ODTU to form an ODTUvkt so that the external structure of the ODTUvkt is the same as the external structure of the ODTUkt, maps the ODTUvkt to timeslot i and timeslot i+n of a 1.25 G ODUt, indicates the type of the at least one pair of ODU0's carried in timeslot i to be ODUk, and transmits the ODUk to the destination node. After a device supporting only the 2.5 G timeslot network receives an ODU2/3, because the type of at least one pair of ODU0's carried in timeslot i is indicated as ODUk, the data in this timeslot is processed according to the ODUk processing method in the prior art. Through the data transmitting method under the present invention, when the ODU2/3 uses a 1.25 G timeslot structure to bear ODU0, the ODU0 can penetrate the device supporting only the 2.5 G timeslot structure. Therefore, the ODU0 can be transmitted in the device which supports only the 2.5 G timeslot structure, and the 1.25 G timeslot structure is applicable in a wider range.

For ease of understanding, the following embodiment supposes that the data is transmitted through three network nodes (sending network node, transferring network node, and receiving network node) in an OTN, where the sending network node and the receiving network node support 1.25 G timeslot networks, and the transferring network node supports only 2.5 G timeslot networks.

Method Embodiment 2

Figure 3:
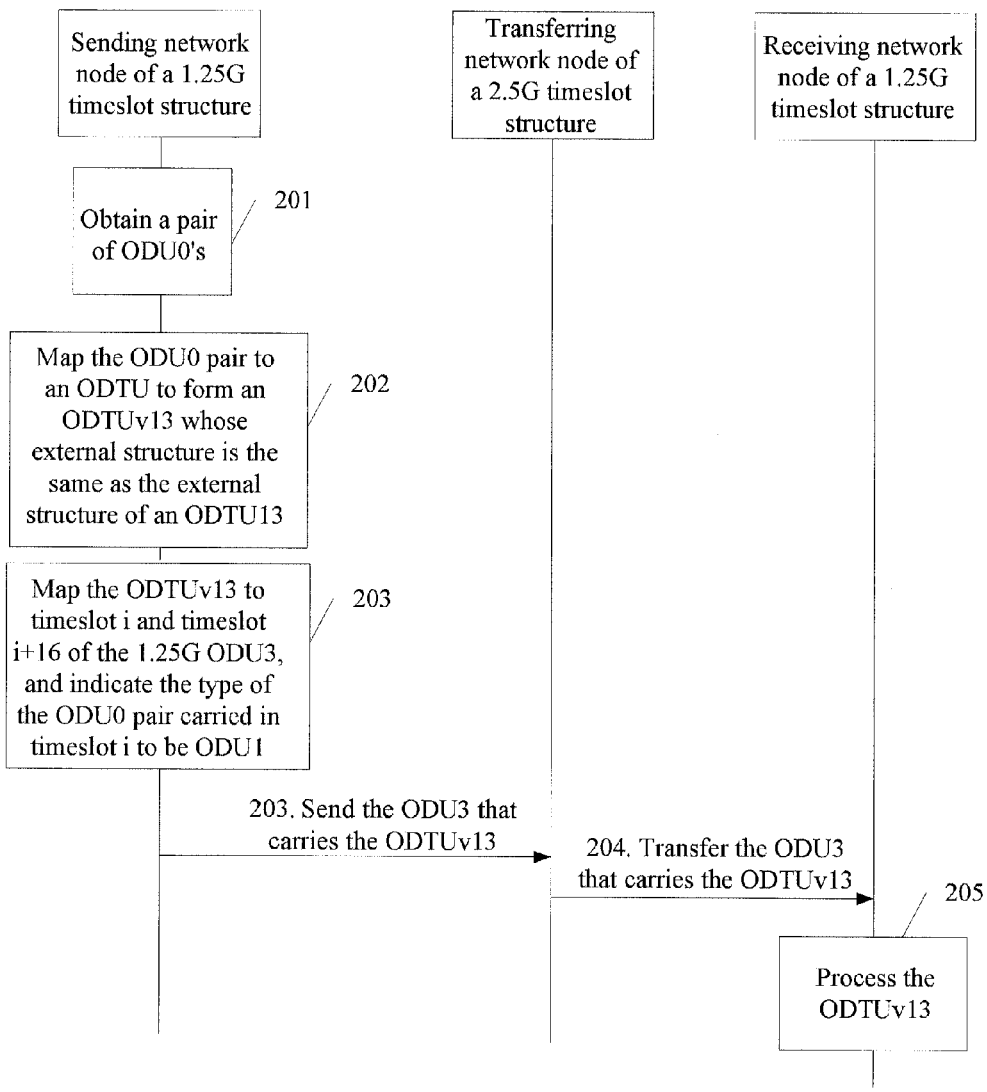
FIG. 3 is a flowchart of a method for transmitting data in an OTN in the second method embodiment.

A method for transmitting data in an OTN is disclosed in this embodiment. In this embodiment, t is 3, and k is 1, and therefore, n is 16, and the value of i is in the range from 1 to 16. As shown in FIG. 3, the method includes the following steps:

Step 201: The sending network node obtains a pair of ODU0's, namely, ODU0a and ODU0b, which are referred to as an ODU0 pair below.

In this embodiment, it is assumed that k is equal to 1. Therefore, two ODU0's need to be obtained.

Step 202: The sending network node maps an ODU0 pair to an ODTU to form an ODTUv13 whose external structure is the same as the external structure of an ODTU13.

Figure 4:
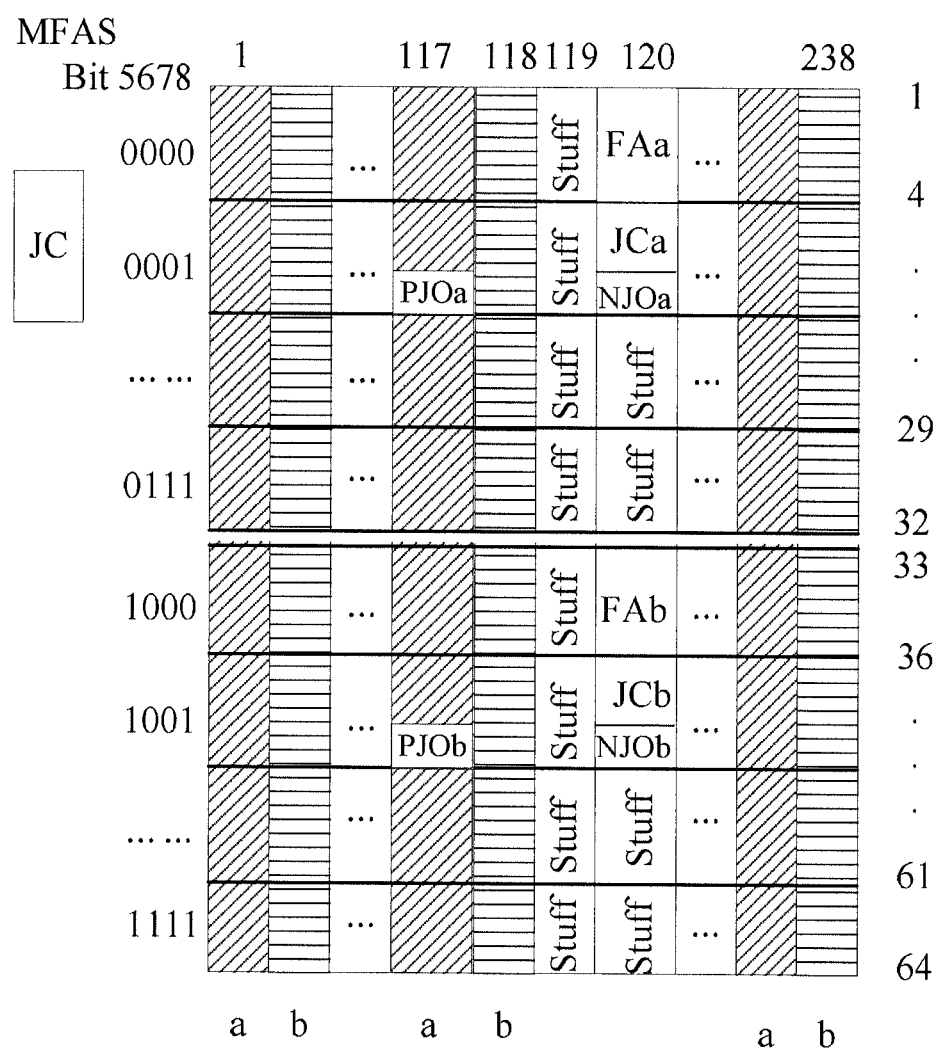
FIG. 4 shows a structure of the ODTUv13 formed in the second method embodiment.

It is understandable that the sending network node may map the ODU0 pair through the following steps (FIG. 4 shows a structure of the formed ODTUv13):

A. Map the data stream in the ODU0 pair to an ODTU to form an ODTUv13.

The external structure of the formed ODTUv13 is the same as the external structure of an ODTU13, namely, 238 columns*64 rows. The data stream in ODU0a is mapped to timeslot a in ODTUv13, as shown in the column with oblique lines in FIG. 4. The data stream in ODU0b is mapped to timeslot b in ODTUv13, as shown in the column with horizontal lines in FIG. 4. Fixed stuffing is performed in column 119 and column 120 in the middle. Bits 5-8 of the Multi Frame Alignment Signal (MFAS) (namely, cycle from 0000 to 1111) are used to indicate the multi-frame cycle of the 16 frames of the ODTUv13. Bit 7 and bit 8 of the JC byte indicate the overall frequency deviation justification of the ODTUv13.

B. Add a JC indication of the ODU0 pair, a corresponding Justification Opportunity (JO) indication, and a Frame Alignment (FA) indication into the ODTUv13.

In order to compensate for the clock frequency difference between the ODU0 and the ODTUv13 multiplexed into the ODU3, justification control indications (JCa and JCb, occupying three bytes respectively) of the ODU0 pair are added into column 120 of the ODTUv13, and the corresponding positive/positive justification opportunity indications (NJOa/PJOa, and NJOb/PJOb, occupying one byte respectively) are added into part of column 120 and column 117. In order for the 1.25 G timeslot network to identify the ODTUv13 frame structure after the data penetrates the 2.5 G timeslot network, FA indications (FAa/FAb, occupying four bytes respectively) may be added into column 120. The four bytes of FAa may be defined as F6, 28, F6, 28; and the four bytes of FAb may be defined as 09, D7, 09, and D7. It is understandable that the positions of NJOa/PJOa/JCa and NJOb/PJOb/JCb are not limited to the positions in FIG. 4, and FAa and FAb may have other values.

Bit 7 and bit 8 of JCa (or JCb) indicate the content of the justification opportunity byte NJOa/PJOa (or NJOb/PJOb). JCa and JCb here are the same as the JC indication rules of ODTUv13. The detailed indication values are shown in Table 1:

TABLE 1

| Bit 7 and bit 8 of JC | Negative Justification Opportunity (NJO) byte | Positive Justification Opportunity (PJO) byte |
|---|---|---|
| 00 | Justification byte | Data byte |
| 01 | Data byte | Data byte |
| 10 | Not generated | |
| 11 | Justification byte | Justification byte |

Through calculation, it is known that the rate of timeslot a and timeslot b in ODTUv13 is: $((238-2)/2/3808)*238/236*16*2.488320 = 1.244160 \pm 20$ ppm. This timeslot rate deviates from the frequency of the ODU0 by $\pm 40$ ppm at most. The frequency deviation range that can be compensated for by a pair of NJOa/PJOa or NJOb/PJOb is $\pm 2/15232 = \pm 132$ ppm. Because the asynchronous frequency deviation between the ODU0 pair and the ODTUv13 has been compensated for by the NJOa/PJOa and NJOb/PJOb, the ODTUv13 may be generated by the local clock that shares a source with the ODU3. Therefore, the overall JC byte value of the ODTUv13 may be set to 00 fixedly, namely, no justification is required.

Step 203: The sending network node maps the ODTUv13 to timeslot i and timeslot i+16 of the 1.25 G ODU3. The mapping method is the same as the method of mapping the G.709 ODTU13 to the ODU3 in the prior art. The JC byte with the fixed value "00" is also mapped to the area for holding the JC byte in the OPU3 overhead of the ODU3. The sending network node indicates the type of at least one pair of ODU0's carried in timeslot i to be ODU1, and transmits the ODU1 to the destination, where 16 is the number of timeslots in a cycle in the 2.5 G ODU3.

Figure 5:
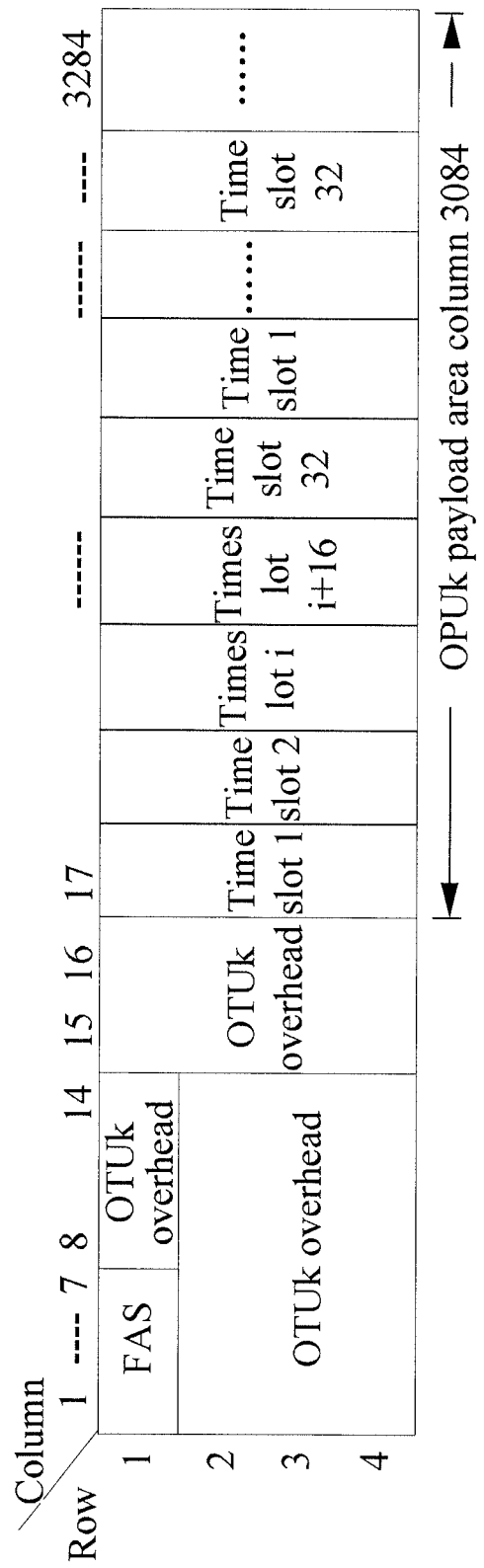
FIG. 5 shows a structure after the ODTUv13 is mapped to the ODU3 in the second method embodiment.

As shown in FIG. 5, a cycle in the 1.25 G ODU3 has 32 timeslots. The sending network node multiplexes the ODTUv13 to timeslot i and timeslot i+16. The ODTU13 may also be multiplexed to timeslot m and timeslot m+16, and the ODTU23 may be multiplexed to timeslot r, timeslot s, timeslot t, timeslot u, timeslot r+16, timeslot s+16, timeslot t+16, and timeslot u+16, where the timeslots of ODTU13, ODTUv13, and ODTU23 need to avoid conflict with each other.

After the ODTU13, ODTUv13, and ODTU23 are mapped to timeslot 32, it is necessary to indicate the multiplex structure of the ODU3 by identifying each timeslot and the ODU carried in each timeslot. In this way, after the data is transmitted to the destination node, the corresponding processing needs to be performed. Table 2 shows the Multiplex Structure Indication (MSI) of the ODU3:

TABLE 2

| Payload Structure Indication (PSI) | Bit1 | Bit2 | Bit3 | Bit4 | Bit5 | Bit6 | Bit7 | Bit8 | TS |
|---|---|---|---|---|---|---|---|---|---|
| | ODU type | | | | TS number | | | | |
| PSI[2] | 0 | 0 | 0 | 0 | 0 | 0 | 0 | 0 | 1 |
| PSI[3] | 0 | 0 | 0 | 0 | 0 | 0 | 0 | 1 | 2 |
| PSI[4] | 0 | 0 | 0 | 0 | 0 | 0 | 1 | 0 | 3 |
| PSI[5] | 0 | 0 | 0 | 0 | 0 | 0 | 1 | 1 | 4 |

TABLE 2-continued

| Payload Structure Indication (PSI) | Bit1 | Bit2 | Bit3 | Bit4 | Bit5 | Bit6 | Bit7 | Bit8 | TS |
|---|---|---|---|---|---|---|---|---|---|
| | ODU type | | | | TS number | | | | |
| PSI[6] | 0 | 0 | 0 | 0 | 0 | 1 | 0 | 0 | 5 |
| PSI[7] | 0 | 0 | 0 | 0 | 0 | 1 | 0 | 1 | 6 |
| PSI[8] | 0 | 0 | 0 | 0 | 0 | 1 | 1 | 0 | 7 |
| PSI[9] | 0 | 0 | 0 | 0 | 0 | 1 | 1 | 1 | 8 |
| PSI[10] | 0 | 1 | 0 | 0 | 1 | 0 | 0 | 0 | 9 |
| PSI[11] | 0 | 1 | 0 | 0 | 1 | 0 | 0 | 1 | 10 |
| PSI[12] | 0 | 1 | 0 | 0 | 1 | 0 | 1 | 0 | 11 |
| PSI[13] | 0 | 1 | 0 | 0 | 1 | 0 | 1 | 1 | 12 |
| PSI[14] | 0 | 0 | 0 | 0 | 1 | 1 | 0 | 0 | 13 |
| PSI[15] | 0 | 0 | 0 | 0 | 1 | 1 | 0 | 1 | 14 |
| PSI[16] | 0 | 0 | 0 | 0 | 1 | 1 | 1 | 0 | 15 |
| PSI[17] | 0 | 0 | 0 | 0 | 1 | 1 | 1 | 1 | 16 |
| PSI[18] | 1 | 1 | 0 | 1 | 0 | 0 | 0 | 0 | 17 |
| PSI[19] | 1 | 1 | 0 | 1 | 0 | 0 | 0 | 1 | 18 |
| PSI[20] | 1 | 1 | 0 | 1 | 0 | 0 | 1 | 0 | 19 |
| PSI[21] | 1 | 1 | 0 | 1 | 0 | 0 | 1 | 1 | 20 |
| PSI[22] | 0 | 0 | 0 | 1 | 0 | 1 | 0 | 0 | 21 |
| PSI[23] | 0 | 0 | 0 | 1 | 0 | 1 | 0 | 1 | 22 |
| PSI[24] | 0 | 0 | 0 | 1 | 0 | 1 | 1 | 0 | 23 |
| PSI[25] | 0 | 0 | 0 | 1 | 0 | 1 | 1 | 1 | 24 |
| PSI[26] | 0 | 1 | 0 | 1 | 1 | 0 | 0 | 0 | 25 |
| PSI[27] | 0 | 1 | 0 | 1 | 1 | 0 | 0 | 1 | 26 |
| PSI[28] | 0 | 1 | 0 | 1 | 1 | 0 | 1 | 0 | 27 |
| PSI[29] | 0 | 1 | 0 | 1 | 1 | 0 | 1 | 1 | 28 |
| PSI[30] | 0 | 0 | 0 | 1 | 1 | 1 | 0 | 0 | 29 |
| PSI[31] | 0 | 0 | 0 | 1 | 1 | 1 | 0 | 1 | 30 |
| PSI[32] | 0 | 0 | 0 | 1 | 1 | 1 | 1 | 0 | 31 |
| PSI[33] | 0 | 0 | 0 | 1 | 1 | 1 | 1 | 1 | 32 |
| RES | | | | | | | | | |

In Table 2, PSI[i] indicates the structure of the OPU3 in the ODU3 in which timeslots are allocated. Timeslots 1-4 and timeslots 17-20 bear eight ODU0's, where the type of the ODU carried in timeslots 1-4 is marked as 00, which indicates ODU1, and the type of the ODU carried in timeslots 17-20 is marked as 11, which indicates ODU0. Timeslots 5-8 and timeslots 21-24 bear four ODU0's, where the type of the ODU is marked as 00, which indicates ODU1. Timeslots 9-12 and timeslots 25-28 bear an ODU2, where the type of the ODU is marked as 01, which indicates ODU2. The remaining timeslots 13-16 and timeslots 29-32 bear four ODU1's.

Step 204: The transferring network node of the 2.5 G timeslot structure receives the ODU3, and demultiplexes it to obtain an indication of the type of the ODU carried in timeslot i. The transferring network node identifies only the MSIs corresponding to timeslots 1-16, and ignores indications for other timeslots. If the indication of timeslot i is 00, the transferring network node performs external processing for the data of this timeslot according to the method of processing the ODU1 in the prior art. For example, the transferring network node schedules them, maps the ODTUv13 and the ODTU13 included in the ODU3 to the 2.5 G ODU3 timeslot, and transmits the ODU3 to the receiving network node of the downstream 1.25 G timeslot structure for further processing.

According to the setting of the optical network transmission system, the transferring network node of the 2.5 G timeslot structure may set the ODU1 (actually including the ODTUv13 that carries two ODU0's) as the receiving network node that forwards the downstream 1.25 G timeslot structure. In step 203, the sending network node indicates the type of the ODU of the timeslot that actually bears the ODTUv13 to be ODU1. Therefore, the transferring network node performs external processing for the ODTUv13 in the timeslot according to the method of processing the ODU1, and does not process the management overhead involved in monitoring the ODU1. Because the ODTUv13 and the ODTU13 share the same external structure, the method of mapping the ODTUv13 to the 2.5 G ODU3 timeslot is the same as the method of mapping the ODTU13 to the 2.5 G ODU3 timeslot in the prior art.

Step 205: The receiving network node of the 1.25 G timeslot receives the ODU3 sent by the transferring network node. Because the 2.5 G ODTUv13 and ODTU13 forwarded from upstream share the same external structure, the receiving network node of the 1.25 G timeslot structure needs to further determine whether the received ODU3 carries an ODU1 pair or ODU0 pair after receiving the ODU3.

Specifically, the receiving network node may search the ODTUv13 and ODTU13 carried by the received ODU3 to obtain an FA indication. By comparing the found FA indication with the preset FA indication, the receiving network node determines whether the ODU3 carries an ODU1 pair or ODU0 pair. If the found FA indication is the same as the preset FA indication of the ODU0 pair and the frame alignment of the ODU0 pair can be accomplished, the receiving network node determines that the ODU3 carries an ODU0 pair, and obtains the ODU0 pair from the ODU3. Specifically, according to the frame structure definition of the ODTUv13, using FAa and FAb as a reference, the receiving network node finds the positions of the bytes such as JCa/NJOa/PJOa (and JCb/NJOb/PJOb), and resolves out the ODU0*a*/ODU0*b* by interpreting the JCa/JCb. If the found FA indication is the same as the preset FA indication of the ODU1 frame and the frame alignment of the ODU1 can be accomplished, it is determined that the ODU3 carries an ODU1 pair. The processing mode may be the same as the ODU1 processing method in the prior art.

Figure 6:
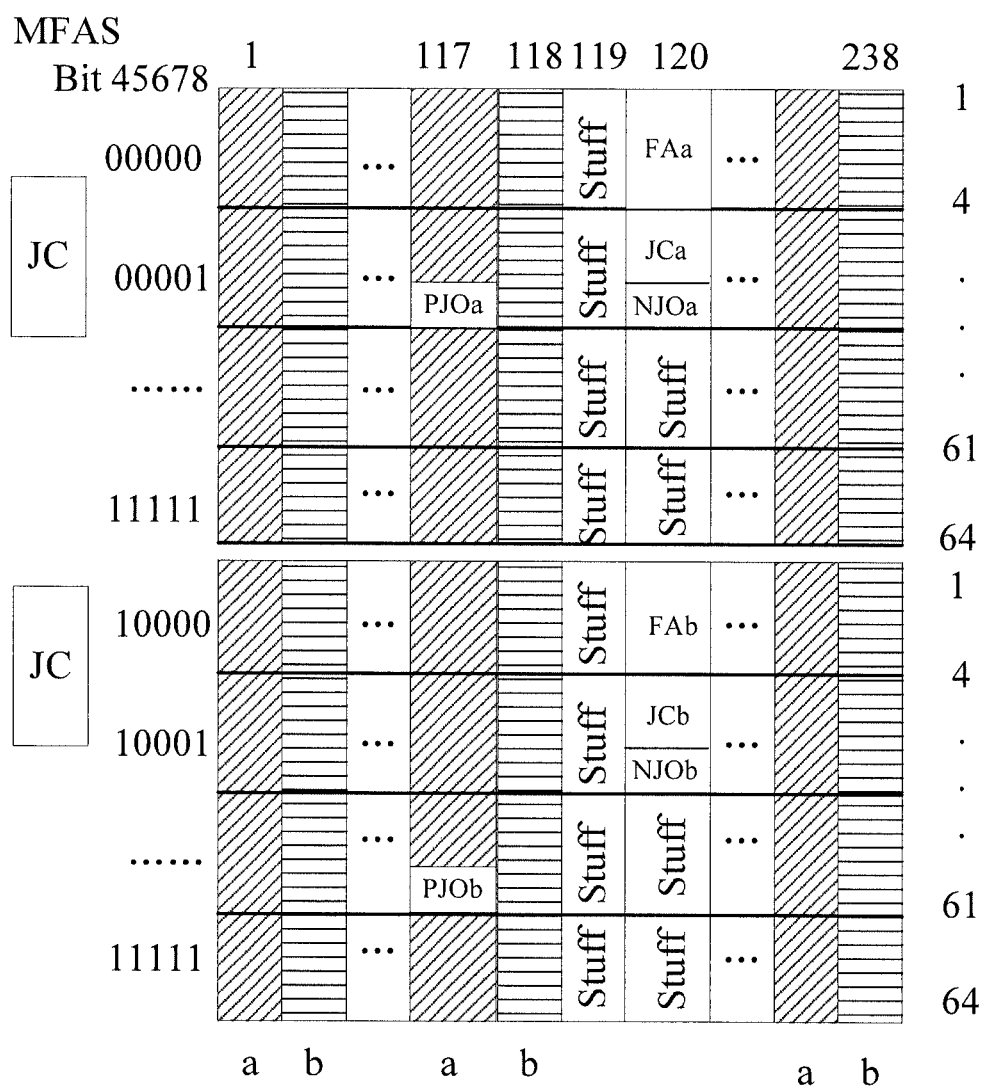
FIG. 6 shows a structure of another ODTUv13 formed in the second method embodiment.

In an embodiment, in step 202 above, the sending network node may perform the following steps to map the ODU0 pair to an ODTU to form an ODTUv13. The structure of the formed ODTUv13 is shown in FIG. 6:

The sending network node adds a JC indication of an ODU0 in an ODU0 pair, a corresponding JO indication, and an FA indication into the ODTUv13 whose 16-multiframe cycle is an odd cycle; and the sending network node adds a JC indication of the other ODU0 in an ODU0 pair, a corresponding JO indication, and an FA indication into the ODTUv13 whose 16-multi-frame cycle is an even cycle.

Bit 4 of the MFAS indicates the odd cycle or even cycle of the 16-multiframe cycle. When bit 4 is 0, the corresponding position of column 120 is JCa/NJOa/PJOa; when bit 4 is 1, the corresponding position of column 120 is JCb/NJOb/PJOb. In this way, the range of the justification compensation frequency deviation of an NJO/PJO pair is ±65 ppm. The frequency deviation compensation is more precise.

In this embodiment, the sending network node maps a pair of ODU0's to an ODTU to form an ODTUv13 so that the external structure of the ODTUv13 is the same as the external structure of the ODTU13, maps the ODTUv13 to timeslot i and timeslot i+16 of a 1.25 G ODU3, indicates the type of the pair of ODU0's carried in timeslot i to be ODU1, and transmits the ODU1 to the destination node. After the transferring network node supporting only the 2.5 G timeslot network receives the ODU3, because the type of a pair of ODU0's carried in timeslot i is indicated as ODU1, the data in this timeslot is processed according to the ODU1 processing method in the prior art, and forwarded to the receiving network node of the 1.25 G timeslot structure for further processing. Through the data transmitting method under the present invention, when the ODU3 uses a 1.25 G timeslot structure to bear the ODU0, the ODU0 can penetrate the device supporting only the 2.5 G timeslot structure. Therefore, the ODU0 can be transmitted in the device which supports only the 2.5 G timeslot structure, and the 1.25 G timeslot structure is applicable in a wider range.

Method Embodiment 3

Figure 7:
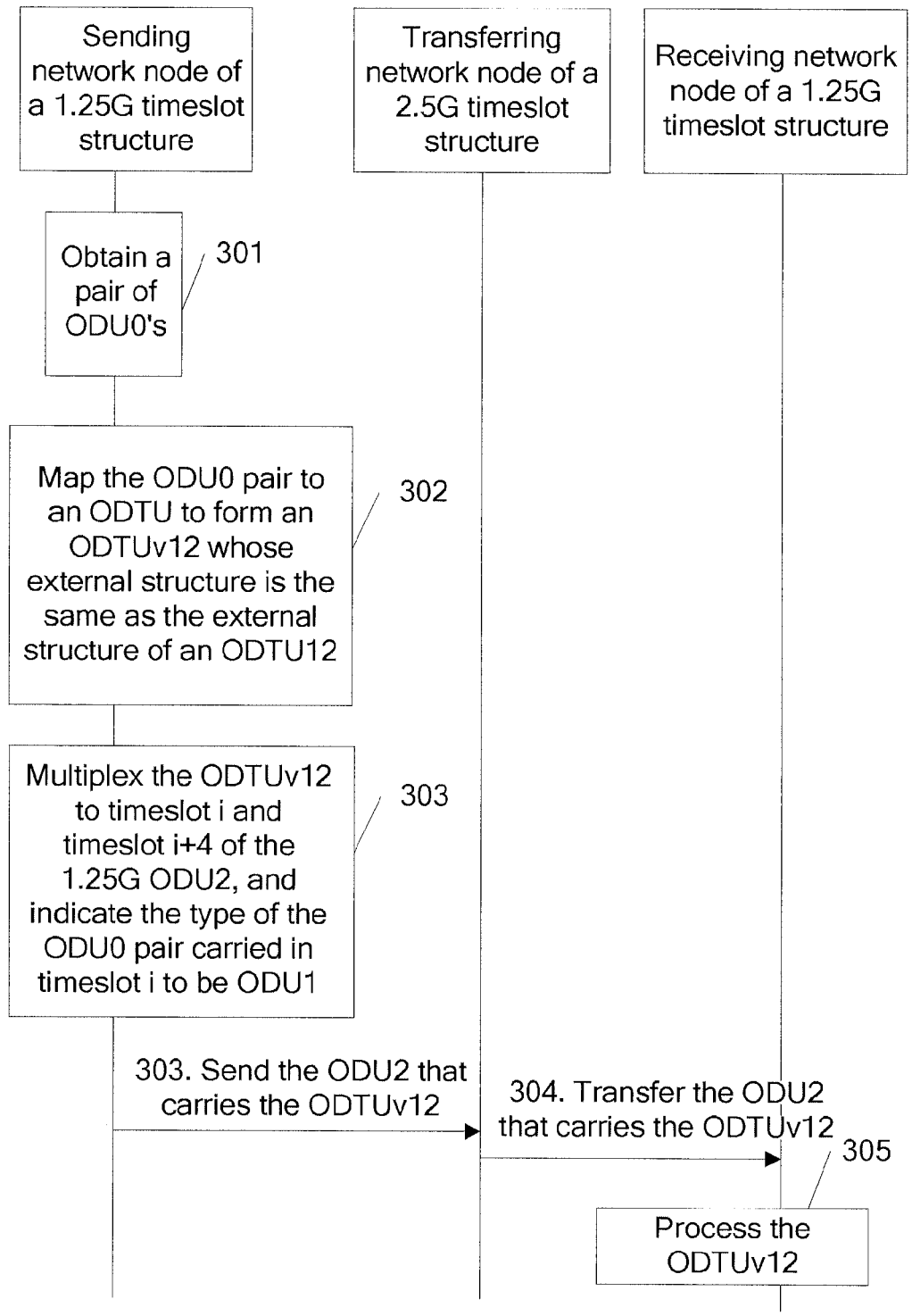
FIG. 7 is a flowchart of a method for transmitting data in an OTN in the third method embodiment.

A method for transmitting data in an OTN is disclosed in this embodiment. In this embodiment, t is 2, and k is 1, and therefore, n is 4, and the value of i is in the range from 1 to 4. As shown in FIG. 7, the method includes the following steps:

Step 301: The sending network node obtains a pair of ODU0's, namely, ODU0a and ODU0b, which are referred to as an ODU0 pair below.

In this embodiment, it is assumed that k is equal to 1. Therefore, two ODU0's need to be obtained.

Step 302: The sending network node maps an ODU0 pair to an ODTU to form an ODTUv12 whose external structure is the same as the external structure of an ODTU12.

Figure 8:
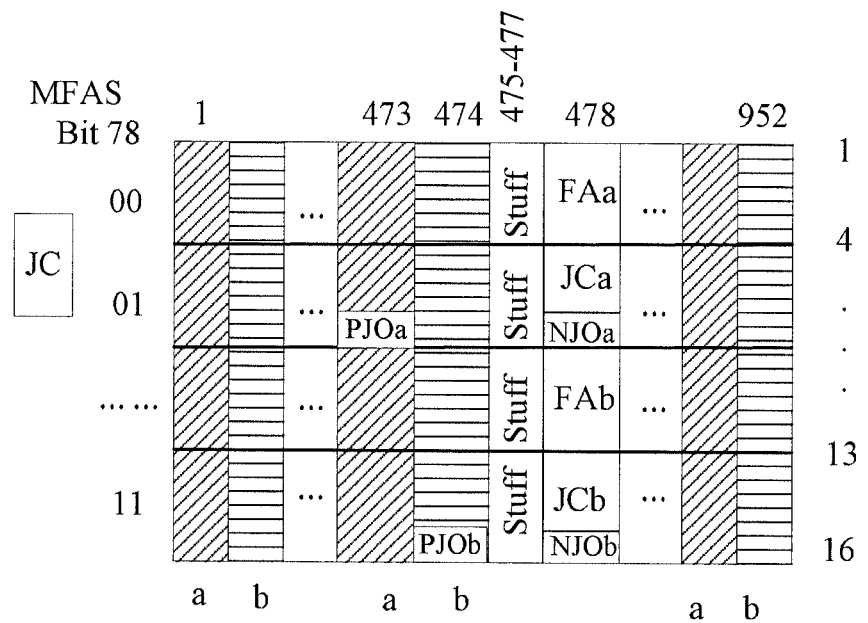
FIG. 8 shows a structure of the ODTUv12 formed in the third method embodiment.

It is understandable that the sending network node may map the ODU0 pair through the following steps (FIG. 8 shows a structure of the formed ODTUv12):

A. Map the data stream in the ODU0 pair to an ODTU to form an ODTUv12.

The external structure of the formed ODTUv12 is the same as the external structure of an ODTU12, namely, 952 columns*16 rows. The data stream in ODU0a is mapped to timeslot a in ODTUv12, as shown in the column with oblique lines in FIG. 8; the data stream in ODU0b is mapped to timeslot b in ODTUv12, as shown in the column with horizontal lines in FIG. 8. Fixed stuffing is performed in columns 475-477 in the middle. Bit 7 and bit 8 of the MFAS (namely, cycle from 00 to 11) are used to indicate the multi-frame cycle of the 4 frames of the ODTUv12. Bit 7 and bit 8 of the JC byte indicate the overall frequency deviation justification of the ODTUv12.

B. Add a JC indication of the ODU0 pair, a corresponding Justification Opportunity (JO) indication, and a Frame Alignment (FA) indication into the ODTUv12.

JC indications (JCa and JCb) of the ODU0 pair are added in column 478 of the ODTUv12, the corresponding positive/negative JO indications (NJOa/PJOa and NJOb/PJOb) are added in part of column 478, column 473, and column 474, and an FA indication (FAa/FAb) is added in column 478. It is understandable that the positions of NJOa/PJO/JCa and NJOb/PJOb/JCb are not limited to the positions in FIG. 8, and FAa and FAb may have other values.

Step 303: The sending network node maps the ODTUv12 to timeslot i and timeslot i+4 of the 1.25 G ODU2. The mapping method is the same as the method of mapping the G.709 ODTU12 to the ODU2 in the prior art. The JC byte with the fixed value "00" is also mapped to the area for holding the JC byte in the OPU2 overhead of the ODU2. The sending network node indicates the type of at least one pair of ODU0's carried in timeslot i to be ODU1, and transmits the ODU1 to the destination, where 4 is the number of timeslots in a cycle in the 2.5 G ODU2.

A cycle in the 1.25 G ODU2 has 8 timeslots. The sending network node multiplexes the ODTUv12 to timeslot i and timeslot i+4. The ODTU12 may also be mapped to timeslot m and timeslot m+4. The timeslots of ODTU12 and ODTUv12 need to avoid conflict with each other.

After the ODTU12 and the ODTUv12 are mapped to 8 timeslots, it is necessary to indicate the ODU2 multiplex structure. Table 3 shows the MSI of the ODU2:

TABLE 3

| PSI | Bit1 Bit2 ODU type | | Bit3 | Bit4 | Bit5 Bit6 TS number | | Bit7 | Bit8 | TS |
|---|---|---|---|---|---|---|---|---|---|
| PSI[2] | 0 | 0 | 0 | 0 | 0 | 0 | 0 | 0 | 1 |
| PSI[3] | 0 | 0 | 0 | 0 | 0 | 0 | 0 | 1 | 2 |
| PSI[4] | 0 | 0 | 0 | 0 | 0 | 0 | 1 | 0 | 3 |
| PSI[5] | 0 | 0 | 0 | 0 | 0 | 0 | 1 | 1 | 4 |
| PSI[6] | 1 | 1 | 0 | 0 | 0 | 1 | 0 | 0 | 5 |
| PSI[7] | 0 | 0 | 0 | 0 | 0 | 1 | 0 | 1 | 6 |
| PSI[8] | 0 | 0 | 0 | 0 | 0 | 1 | 1 | 0 | 7 |
| PSI[9] | 0 | 0 | 0 | 0 | 0 | 1 | 1 | 1 | 8 |

In Table 3, timeslot 1 and timeslot 5 bear two ODU0's. The type of the ODU carried in timeslot 1 is marked as 00, which indicates ODU1; the type of the ODU carried in timeslot 5 is marked as 11, which indicates ODU0. Timeslots 2-4 and timeslots 6-8 bear three ODU1's, and the type of the ODU is marked as 00, which indicates ODU1.

Step 304: The transferring network node of the 2.5 G timeslot structure receives the ODU2, and demultiplexes it to obtain an indication of the type of the ODU carried in timeslot i. The transferring network node identifies only the MSIs corresponding to timeslots 1-4, and ignores the indications for other timeslots. If the indication of timeslot i is 00, the transferring network node performs external processing for the data of this timeslot according to the method of processing the ODU1 in the prior art. For example, the transferring network node schedules them, maps the ODTUv12 and the ODTU12 included in the ODU2 to the 2.5 G ODU2 timeslot, and transmits the ODU2 to the receiving network node of the downstream 1.25 G timeslot structure for further processing.

The detailed method is the same as the method of processing ODU3 and ODTUv13 in step 204.

Step 305: The receiving network node of the 1.25 G timeslot structure receives the ODU2 sent by the transferring network node, and needs to further determine whether the ODU2 carries an ODU1 pair or ODU0 pair.

Specifically, the receiving network node may search the ODTUv12 and ODTU12 carried by the received ODU2 to obtain an FA indication. By comparing the found FA indication with the preset FA indication, the receiving network node determines whether the ODU2 carries an ODU1 pair or ODU0 pair. If the found FA indication is the same as the preset FA indication of the ODU0 pair and the frame alignment of the ODU0 pair can be accomplished, the receiving network node determines that the ODU2 carries an ODU0 pair, and obtains the ODU0 pair (ODU0a/ODU0b) from the ODU2. If the found FA indication is the same as the preset FA indication of the ODU1 frame and the frame alignment of the ODU1 can be accomplished, it is determined that the ODU2 carries an ODU1 pair. The processing mode may be the same as the ODU1 processing method in the prior art.

In this embodiment, the sending network node maps a pair of ODU0's to an ODTU to form an ODTUv12 so that the external structure of the ODTUv12 is the same as the external structure of the ODTU12, maps the ODTUv12 to timeslot i and timeslot i+4 of a 1.25 G ODU2, indicates the type of the pair of ODU0's carried in timeslot i to be ODU1, and transmits the ODU1 to the destination node. After the transferring network node supporting only the 2.5 G timeslot network receives the ODU2, because the type of a pair of ODU0's carried in timeslot i is indicated as ODU1, the data in this timeslot is processed according to the ODU1 processing method in the prior art, and forwarded to the receiving network node of the 1.25 G timeslot structure for further processing. Through the data transmitting method under the present invention, when the ODU2 uses a 1.25 G timeslot structure to bear the ODU0, the ODU0 can penetrate the device supporting only the 2.5 G timeslot structure. Therefore, the ODU0 can be transmitted in the device which supports only the 2.5 G timeslot structure, and the 1.25 G timeslot structure is applicable in a wider range.

Device Embodiment 1

Figure 9:
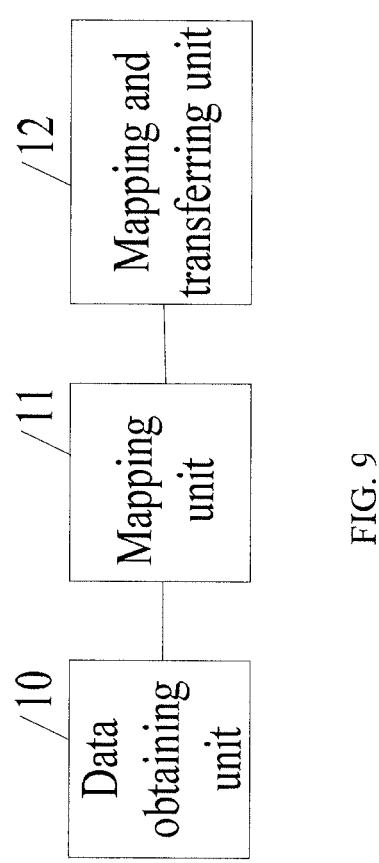
FIG. 9 shows a structure of a network node provided in the first device embodiment.

A network node is provided in this embodiment. As shown in FIG. 9, the network node includes:

a data obtaining unit 10, adapted to obtain at least one pair of ODU0's;

a mapping unit 11, adapted to: map the at least one pair of ODU0's obtained by the data obtaining unit 10 to an ODTU to form an ODTUvkt, where k is greater than or equal to 1, t is 2 or 3, and the external structure of the ODTUvkt is the same as the external structure of the ODTUkt, wherein: the same external structure here refers to the same number of rows and columns, the same position of the fixed filler column, and the same structure and indication rules of the overall Justification Control (JC) indication; and a mapping and transferring unit 12, adapted to: map the ODTUvkt formed by the mapping unit 11 to timeslot i and timeslot i+n of a timeslot cycle of a 1.25 G ODUt, indicate the type of at least one pair of ODU0's carried in timeslot i to be ODUk, and transmit the ODUk to a destination node, where n is the number of timeslots in the timeslot cycle in a 2.5 G ODUt.

In this embodiment, the mapping unit 11 in the network node maps at least one pair of ODU0's to an ODTU to form an ODTUvkt so that the external structure of the ODTUvkt is the same as the external structure of the ODTUkt; the mapping and transferring unit 12 maps the ODTUvkt to timeslot i and timeslot i+n of a 1.25 G ODUt, indicates the type of the at least one pair of ODU0's carried in timeslot i to be ODUk, and transmits the ODUk to the destination node. After a device supporting only the 2.5 G timeslot network receives an ODU2/3, because the type of at least one pair of ODU0's carried in timeslot i is indicated as ODUk, the data in this timeslot is processed according to the ODUk processing method in the prior art. Through the data transmitting method under the present invention, when the ODU2/3 uses a 1.25 G timeslot structure to bear ODU0, the ODU0 can penetrate the device supporting only the 2.5 G timeslot structure. Therefore, the ODU0 can be transmitted in the device which supports only the 2.5 G timeslot structure, and the 1.25 G timeslot structure is applicable in a wider range.

Device Embodiment 2

Figure 10:
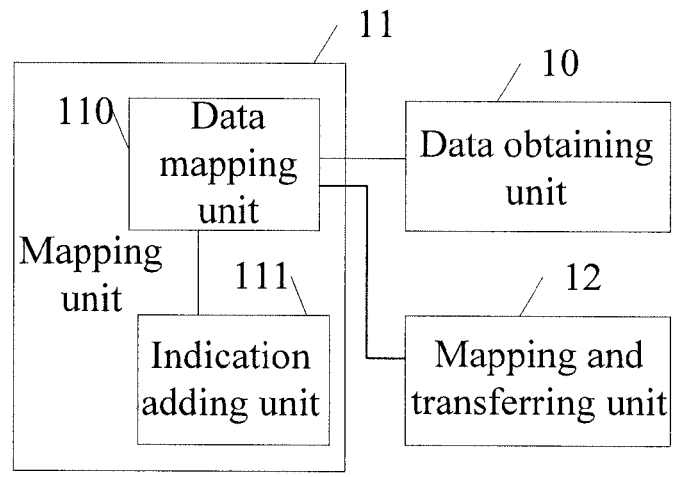
FIG. 10 shows a structure of a network node provided in the second device embodiment.

A network node is provided in this embodiment. Compared with device embodiment 1, this embodiment provides a mapping unit 11 which is more sophisticated. As shown in FIG. 10, the mapping unit 11 includes:

a data mapping unit 110, adapted to map the data stream in a pair of ODU0's obtained by the data obtaining unit 10 to an ODTU to form an ODTUvkt; and an indication adding unit 111, adapted to add JC indications of a pair of ODU0's, corresponding JO indications, and FA indications into the ODTUvkt formed by the data mapping unit 110.

Device Embodiment 3

Figure 11:
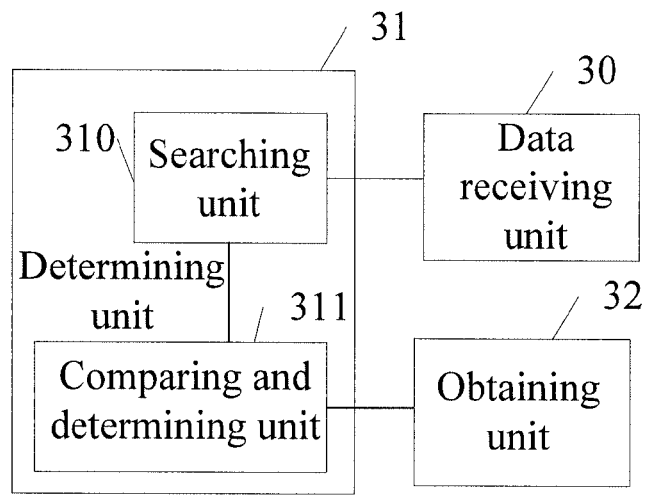
FIG. 11 shows a structure of a network node provided in the third device embodiment.
Figure 12:
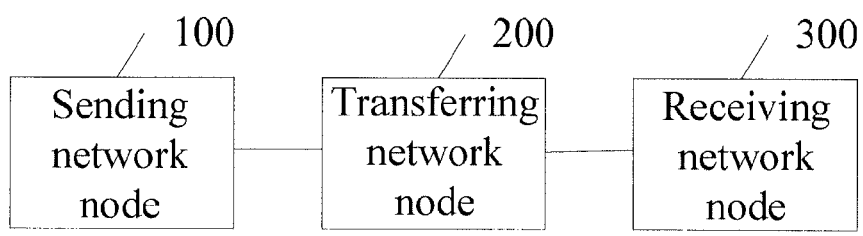
FIG. 12 shows a structure of a system for transmitting data in an OTN in a system embodiment.

A network node is provided in this embodiment. The network node in this embodiment has a 1.25 G timeslot structure. As shown in FIG. 11, the network node includes:

a data receiving unit 30, adapted to: receive an ODUt sent by a network node of a 2.5 G timeslot structure, where the ODUt carries an ODTU, and t is 2 or 3;

a determining unit 31, adapted to determine whether the ODTU carried in the ODUt received by the data receiving unit 30 includes at least one pair of ODU0's; and an obtaining unit 32, adapted to obtain at least one pair of ODU0's if the determining unit 31 determines that the ODTU includes at least one pair of ODU0's.

In a detailed embodiment, the determining unit 31 includes: a searching unit 310, adapted to determine whether the ODTU carried in the ODUt received by the data receiving unit 30 includes at least one pair of ODU0's; and a comparing and determining unit 311, adapted to: compare the FA indication found by the searching unit 310 with the preset FA indication; and if the FA indication is the same as the FA indications of at least one pair of ODU0's, determine that the ODTU bears at least one pair of ODU0's. After the comparing and determining 311 makes the judgment, the obtaining unit 32 obtains at least one pair of ODU0's.

After the data receiving unit 30 receives the ODUt sent by the network node of the 2.5 G timeslot structure, the ODTUvkt and the ODTUkt carried in the ODUt share the same external structure. The determining unit 31 needs to determine whether the ODUt carries an ODU1 pair or ODU0 pair.

System Embodiment

A system for transmitting data in an OTN is provided in this embodiment. As shown in FIG. 11, the system includes: a sending network node 100, a transferring network node 200, and a receiving network node 300. In this embodiment, the sending network node 100 and the receiving network node 300 have a 1.25 G timeslot structure, and the transferring network node 200 has a 2.5 G timeslot structure.

The sending network node 100 is adapted to: obtain at least one pair of ODU0's; map the at least one pair of ODU0's to an ODTU to form an ODTUvkt, where k is greater than or equal to 1, t is 2 or 3, and the external structure of the ODTUvkt is the same as the external structure of the ODTUkt; and map the ODTUvkt to timeslot i and timeslot i+n of a timeslot cycle of a 1.25 G ODUt, indicate the type of at least one pair of ODU0's carried in timeslot i to be ODUk, and transmit the ODUk to the transferring network node 200, where n is the number of timeslots in a timeslot cycle in a 2.5 G ODUt.

The transferring network node 200 is adapted to: receive the ODUt sent by the sending network node 100, and demultiplex the ODUt to obtain an indication about the type of the ODU carried in timeslot i; and if the type of the ODU is indicated as an ODUk, process the data of timeslot i according to the method of processing the ODUk, and send the processed ODUt to the receiving network node 300.

The receiving network node 300 is adapted to: receive the ODUt; determine that the ODTU in the ODUt includes at least one pair of ODU0's; and obtain the at least one pair of ODU0's from the ODTU.

In the embodiments of the present invention, the network node maps at least one pair of ODU0's to an ODTU to form an ODTUvkt so that the external structure of the ODTUvkt is the same as the external structure of the ODTUkt, maps the ODTUvkt to timeslot i and timeslot i+n of a 1.25 G ODUt, indicates the type of the at least one pair of ODU0's carried in timeslot i to be ODUk, and transmits the ODUk to the destination node. After a device supporting only the 2.5 G timeslot network receives an ODU2/3, because the type of at least one pair of ODU0's carried in timeslot i is indicated as ODUk, the data in this timeslot is processed according to the ODUk processing method in the prior art. Through the data transmitting method under the present invention, when the ODU2/3 uses a 1.25 G timeslot structure to bear ODU0, the ODU0 can penetrate the device supporting only the 2.5 G timeslot structure. Therefore, the ODU0 can be transmitted in the device which supports only the 2.5 G timeslot structure, and the 1.25 G timeslot structure is applicable in a wider range.

It is understandable to those skilled in the art that all or part of the steps in the foregoing embodiments may be implemented by hardware instructed by a program. The program may be stored in a computer-readable storage medium such as Read Only Memory (ROM), Random Access Memory (RAM), magnetic disk, or Compact Disk (CD).

Elaborated above are a method, a system, and a device for transmitting data in an OTN under the present invention. The network nodes in the embodiments of the present invention include user equipment and servers. Although the invention is described through some exemplary embodiments, the invention is not limited to such embodiments. It is apparent that those skilled in the art can make modifications and variations to the invention without departing from the spirit and scope of the invention. The invention shall cover the modifications and variations provided that they fall in the scope of protection defined by the following claims or their equivalents.

What is claimed is:

1. A method for transmitting data in an Optical Transport Network (OTN), comprising:
    obtaining at least one pair of Optical Channel Data Units-0 (ODU0's);
    mapping the at least one pair of ODU0's to an Optical Channel Data Tributary Unit (ODTU) to form an ODTUvkt, wherein k is greater than or equal to 1, t is 2 or 3, k is smaller than t, and an external structure of the ODTUvkt is the same as an external structure of an Optical Channel Data Tributary Unit-kt (ODTUkt); and
    mapping the ODTUvkt to timeslot i and timeslot i+n of a timeslot cycle of a 1.25 G Optical Channel Data Unit-t (ODUt), indicating a type of at least one pair of ODU0's carried in the timeslot i to be Optical Channel Data Unit-k (ODUk), and transmitting the ODUk to a destination node, wherein n is number of timeslots in a timeslot cycle of a 2.5 G ODUt.

2. The method of claim 1, wherein the mapping of the at least one pair of ODU0's to the ODTU to form the ODTUvkt comprises:
    mapping data streams in the at least one pair of ODU0's to the ODTU to form the ODTUvkt; and
    adding Justification Control (JC) indications of the at least one pair of ODU0's, corresponding Justification Opportunity (JO) indications, and Frame Alignment (FA) indications into the ODTUvkt.

3. The method of claim 2, wherein the adding of the JC indications of the pair of ODU0's, the corresponding JO indications, and the FA indications into the ODTUvkt comprises:
    adding a JC indication of one ODU0 in the pair of ODU0's, a corresponding JO indication, and an FA indication into the ODTUvkt whose n multi-frame cycle is an odd cycle; and
    adding a JC indication of the other ODU0 in the pair of ODU0's, a corresponding JO indication, and an FA indication into the ODTUvkt whose n multi-frame cycle is an even cycle.

4. The method according to claim 1, further comprising:
    indicating a type of at least one pair of ODU0's carried in the timeslot i+n to be ODU0.

5. A network node, comprising:
    a data obtaining unit, adapted to obtain at least one pair of Optical Channel Data Units-0 (ODU0's);
    a mapping unit, adapted to: map the at least one pair of ODU0's obtained by the data obtaining unit to an Optical Channel Data Tributary Unit (ODTU) to form an ODTUvkt, where k is greater than or equal to 1, t is 2 or 3, k is smaller than t, and an external structure of the ODTUvkt is the same as an external structure of an Optical Channel Data Tributary Unit-kt (ODTUkt); and
    a mapping and transferring unit, adapted to: map the ODTUvkt formed by the mapping unit to timeslot i and timeslot i+n of a timeslot cycle of a 1.25 G Optical Channel Data Unit-t (ODUt), indicate a type of at least one pair of ODU0's carried in the timeslot i to be Optical Channel Data Unit-k (ODUk), and transmit the ODUk to a destination node, wherein n is number of timeslots in a timeslot cycle of a 2.5 G ODUt.

6. The network node of claim 5, wherein the mapping unit comprises:
    a data mapping unit, adapted to map data streams in a pair of ODU0's obtained by the data obtaining unit to the ODTU to form the ODTUvkt; and
    an indication adding unit, adapted to add Justification Control (JC) indications of the pair of ODU0's, corresponding Justification Opportunity (JO) indications, and Frame Alignment (FA) indications into the ODTUvkt formed by the data mapping unit.

7. A network node, comprising:
    a data receiving unit, configured to: receive an Optical Channel Data Unit-t (ODUt) sent by a network node of a 2.5 G timeslot structure, wherein the ODUt carries an Optical Channel Data Tributary Unit (ODTU), and t is 2 or 3;
    a determining unit, configured to determine that the ODTU carried in the ODUt received by the data receiving unit comprises at least one pair of Optical Channel Data Units-0 (ODU0's); and
    an obtaining unit, configured to obtain the at least one pair of ODU0's if the determining unit determines that the ODTU comprises the at least one pair of ODU0's;
    wherein the determining unit further comprises:
        a searching unit, configured to search the ODTU to obtain a Frame Alignment (FA) indication; and
        a comparing and determining unit, configured to: compare the FA indication found by the searching unit with preset FA indications; and if the FA indication is the same as FA indications of the at least one pair of ODU0's, determine that the ODTU bears the at least one pair of ODU0's.

* * * * *